No. 781,915. PATENTED FEB. 7, 1905.
J. W. SMALLMAN.
TRIGGER MECHANISM FOR DROP-DOWN GUNS OR RIFLES.
APPLICATION FILED DEC. 13, 1898.

3 SHEETS—SHEET 1.

WITNESSES:
S. L. Metcalfe.
Henry G. O. Tomblin.

INVENTOR:
James W. Smallman.

No. 781,915. PATENTED FEB. 7, 1905.
J. W. SMALLMAN.
TRIGGER MECHANISM FOR DROP-DOWN GUNS OR RIFLES.
APPLICATION FILED DEC. 13, 1898.
3 SHEETS—SHEET 2.
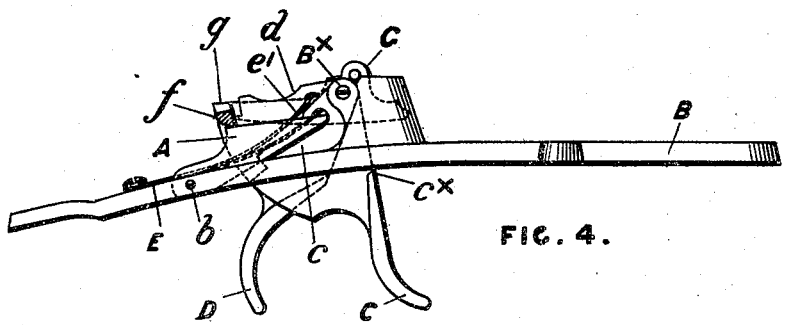
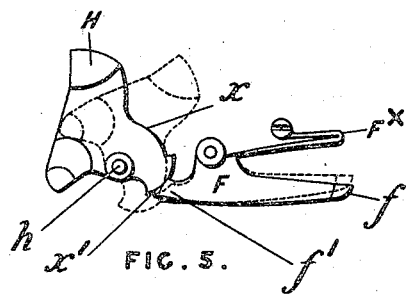
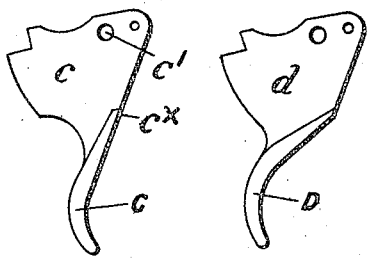
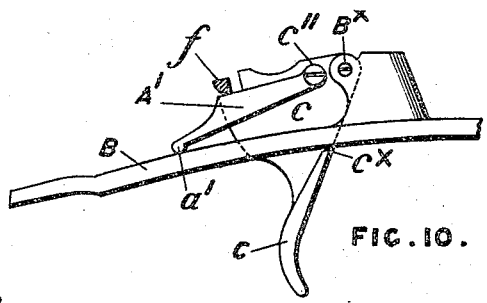
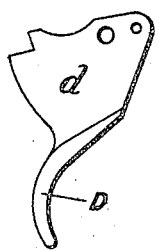
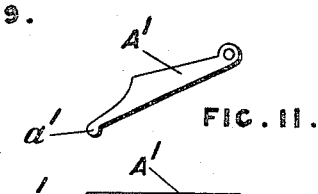
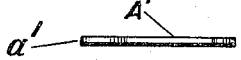
WITNESSES:
INVENTOR:
James W. Smallman.

No. 781,915. PATENTED FEB. 7, 1905.
J. W. SMALLMAN.
TRIGGER MECHANISM FOR DROP-DOWN GUNS OR RIFLES.
APPLICATION FILED DEC. 13, 1898.
3 SHEETS—SHEET 3.
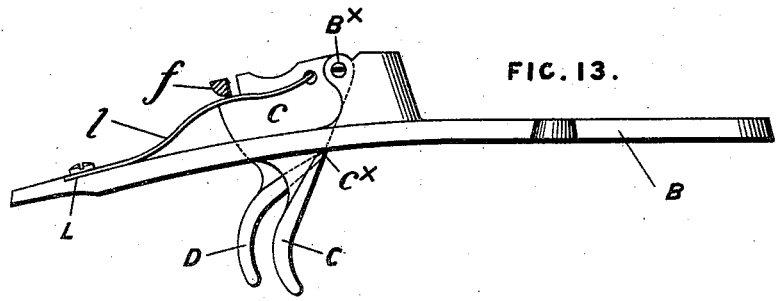
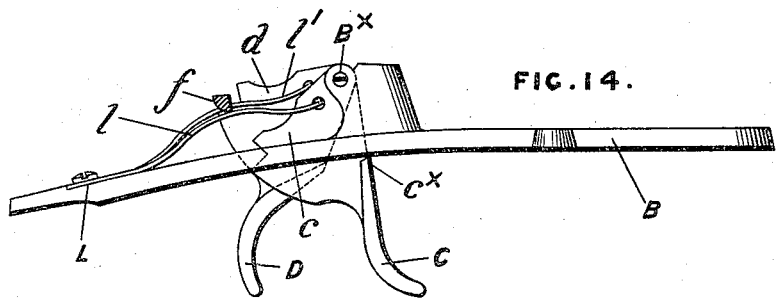
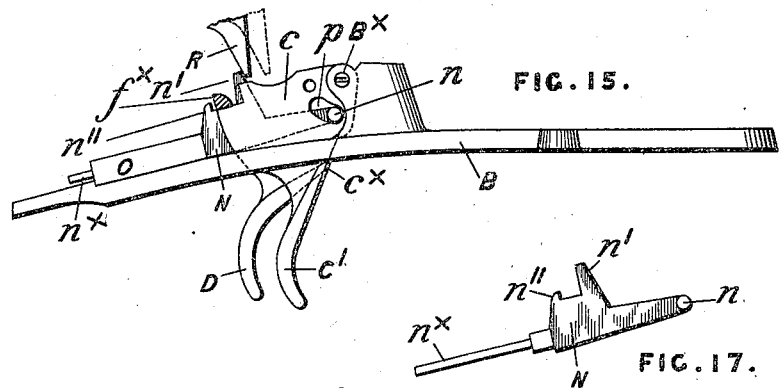
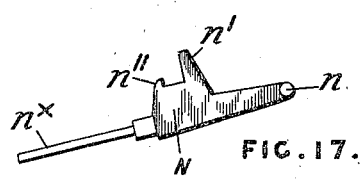
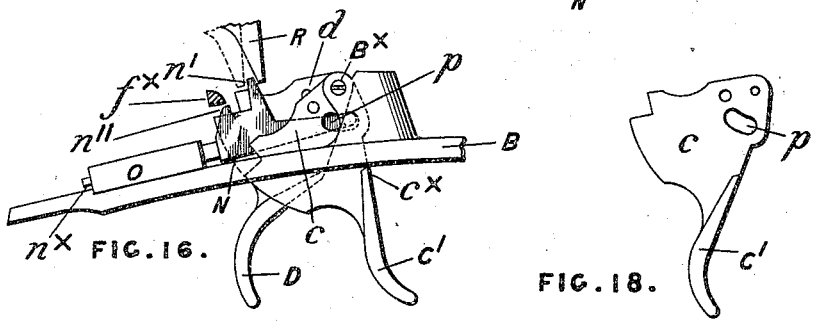
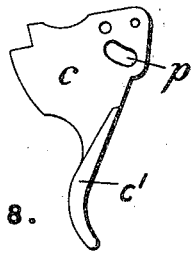
WITNESSES:
INVENTOR:
James W. Smallman.

No. 781,915. Patented February 7, 1905.

UNITED STATES PATENT OFFICE.

JAMES W. SMALLMAN, OF CAMP HILL GRANGE, NEAR NUNEATON, ENGLAND.

TRIGGER MECHANISM FOR DROP-DOWN GUNS OR RIFLES.

SPECIFICATION forming part of Letters Patent No. 781,915, dated February 7, 1905.

Application filed December 13, 1898. Serial No. 699,134.

*To all whom it may concern:*

Be it known that I, JAMES WILLIAM SMALLMAN, a subject of the King of Great Britain and Ireland, residing at Camp Hill Grange, near Nuneaton, in the county of Warwick, England, have invented new and useful Trigger Mechanism for Drop-Down Guns or Rifles, (in respect whereof I have obtained a patent in Great Britain, No. 11,342, dated May 18, 1898,) of which the following is a specification.

This invention relates to the trigger mechanism of double-barrel drop-down hammer or hammerless guns and rifles.

The accompanying drawings illustrate, by way of example, those parts of a double-barrel side-lock hammerless sporting-gun that embody my invention, the parts of the gun which are omitted presenting no feature of novelty.

Figure 1:
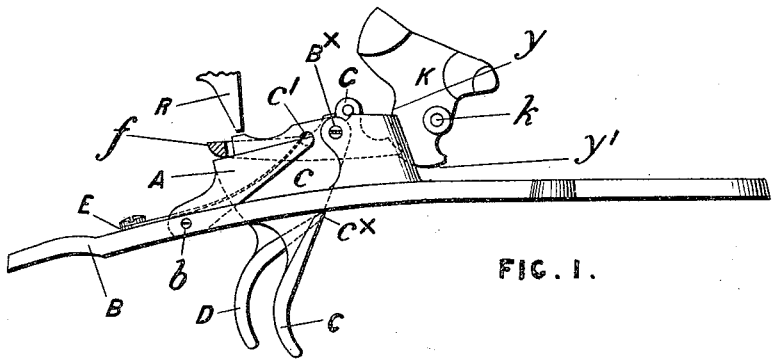
Figure 2:
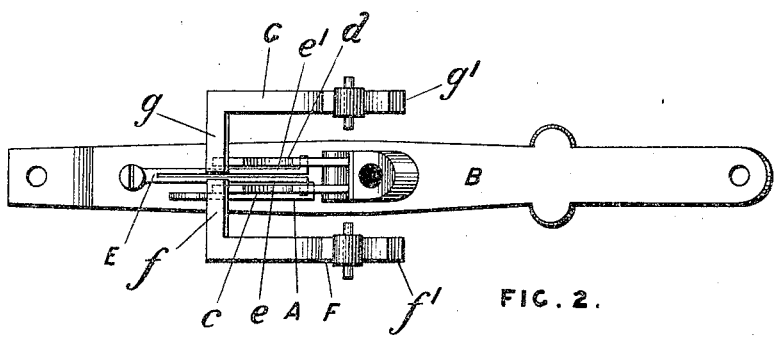
Figure 3:
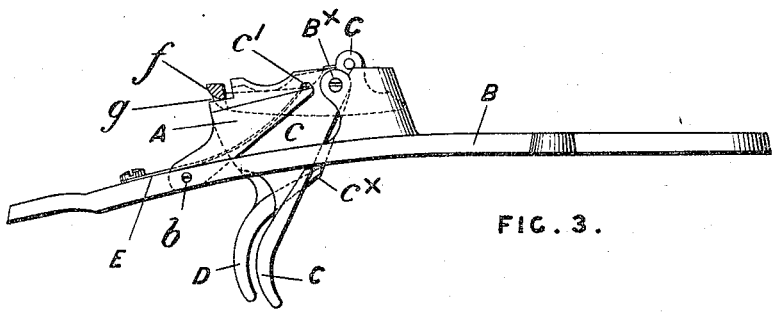

Figure 1 is a side elevation of the trigger-plate with the triggers, which are in their normal positions, the trigger-spring and the trigger-actuating lever, the sear-tail of the right lock, the tumbler and sear of the left lock, and a portion of the safety-bolt being also shown. Fig. 2 is a plan of the trigger-plate with the triggers, the trigger-spring, and the trigger-actuating lever, both sears being also included. Fig. 3 corresponds with Fig. 1 except that the right trigger is in its extreme backward position and the left tumbler is omitted. In Fig. 4 the right trigger is in its advanced or extreme forward position, the left trigger remaining in the position it occupies in Figs. 1 and 3. Fig. 5 is a side elevation of the right tumbler, sear, and sear-spring. Fig. 6 is a side elevation of the trigger-actuating lever. Fig. 7 is a plan corresponding with Fig. 6. Fig. 8 is a side elevation of the right trigger. Fig. 9 is a similar view of the left trigger. In Fig. 10 the trigger-actuating lever is pivoted to the trigger-blade instead of to the trigger-plate. Fig. 11 is a side elevation of the trigger-actuating lever illustrated in the preceding figure. Fig. 12 is a plan corresponding with Fig. 11. Fig. 13 shows a trigger-spring upon which the right sear-tail acts directly in causing the right trigger to advance. In Fig. 14 the right sear-tail having overpowered the right arm of the split trigger-spring has caused the right trigger to advance into its extreme forward position. In Fig. 15 is represented a spring-actuated slide which when the right trigger is released after the firing of the right barrel causes that trigger to advance. In Fig. 16 the right trigger has been released and then taken by the slide into its advanced position. Fig. 17 is a side elevation of the slide. Fig. 18 is a side elevation of the right trigger pertaining to the construction illustrated in Figs. 15 and 16.

In ordinary double-barrel drop-down guns and rifles the two triggers are placed far enough apart to permit the finger to be inserted between them. This distance is so great that after the finger has pulled one trigger to fire the first barrel it is found advantageous to move the hand until the finger has been brought into a convenient position for pulling the other trigger to fire the second barrel.

The object of my present invention is to so construct a double-barrel gun or rifle with two triggers that the grasp of the stock may be advantageously maintained after the pulling of the first trigger, and I accomplish this by arranging the two triggers very near together and causing the first trigger after it has been pulled to advance so as to leave sufficient space between the two triggers to permit the finger to be readily inserted and pressed against the second trigger.

In carrying out my invention I prefer to employ a lever pivoted to the trigger-plate. The forward end of the lever engages with the first trigger-blade. The first sear-tail lies just above the lever when the first lock is cocked. The tumbler of the first lock is so shaped that when said lock is released the first sear-tail, under the influence of the sear-spring, can press upon the lever and cause the trigger to advance. The two triggers are placed so near together that when the first trigger is pulled back into its extreme position it nearly touches the second trigger. I may utilize a trigger-spring for bringing about the separation of the triggers. When the first lock is cocked, the trigger-spring presses the first trigger up to the first sear-tail; but when said lock is released that sear-tail comes into a lower position and by pressing down the trigger-spring causes said trigger to advance. The second barrel can be fired first, when there is time for the finger to push the first trigger forward prior to pulling the second trigger.

I do not limit myself to any particular mechanism for causing the first trigger to advance after the release of the first lock, as this end can be accomplished in various ways. For instance, a slide taken back by the safety-bolt and held back by the first sear-tail can, while moving forward after the release of the first lock, turn the first trigger into its advanced position.

A is a lever pivoted on a pin $b$ to the trigger-plate B.

C is the right and D the left trigger. Both triggers are pivoted on the pin $B^\times$.

E is the ordinary split trigger-spring. The two arms of this spring are marked $e$ and $e'$.

The spur $a$, Fig. 7, on the forward end of the lever A enters a hole $c'$ in the trigger-blade $c$. A spur at the forward end of the arm $e$ also enters the hole $c'$. The spur $a$ bears against the lower surface and the spur on the arm $e$ against the upper surface of said hole. A spur at the end of the arm $e'$ enters a hole in the trigger-blade $d$.

F is the right sear. The right sear-tail $f$ before the lock is released lies just above the lever A.

$f'$ is the right sear-nose.

G is the left sear.

$g$ is the left sear-tail, and $g'$ the left sear-nose.

H is the right tumbler, which turns about the axis $h$.

K is the left tumbler, and $k$ the axis about which it turns.

When the tumblers H and K are cocked, the sear-tails $f$ and $g$ are at the same level, the radius of the arc $x$ being equal to the radius of the arc $y$. The point $x'$ is nearer than the arc $x$ to the axis $h$. Consequently when the tumbler H falls the sear F (under the pressure of the sear-spring $F^\times$) turns beyond its normal position. The tumbler H is shown in its fallen position in full lines and in its cocked position in broken lines, the corresponding positions of the sear F being also shown in full and broken lines. The tumbler K is formed in the usual way with the point $y'$ at the same distance as the arc $y$ from the axis $k$. Consequently when that tumbler is in its fallen position the sear-tail $g$ lies at the same level as it does when said tumbler is cocked. A stop $c^\times$ on the trigger C beds against the trigger-plate B when said trigger is in its extreme backward position, thus preventing that trigger from being pulled against the trigger D. (If preferred, the safety-bolt R may be utilized as a stop for the trigger C.) When the trigger C after being pulled has been released, the sear-tail $f$, under the influence of the sear-spring $F^\times$, presses upon the lever A and forces that lever to turn very slightly about the pin $b$, depressing the spur $a$, and thereby causing the trigger C to advance. On comparing Fig. 1 with Fig. 4 it will be seen that after the automatic advance of the right trigger there is considerably more space between the triggers than there was originally.

The lever A', Figs. 10 to 12, is pivoted on a pin $c''$, screwed into the trigger-blade $c$, the fulcrum $a'$ of said lever resting behind the trigger C on the trigger-plate B. The left trigger (not shown in Fig. 10) is like the one previously illustrated. The action of the lever A' differs from that of the lever A in no essential respect. The extremity of the pin $c''$ may protrude into the space between the trigger-blades for the end of the right arm of the trigger-spring to bear against, a spur at the end of the left arm of the trigger-spring engaging, as usual, in a hole in the left trigger-blade.

The trigger-spring L, Figs. 13 and 14, has two arms $l$ and $l'$, that lie close to the sear-tails. (The exact shape of the arm $l'$ is immaterial, as that arm performs no function beyond the ordinary one of holding the trigger-blade $d$ against the left sear-tail.) It is essential for the arm $l$ to touch or lie close to the sear-tail $f$, so that when the right lock has been released said sear-tail can under the influence of the sear-spring press down said arm $l$, taking the spur on the end of that arm away from the upper surface of the hole in the trigger-blade $c$ and bringing it against the lower surface of said hole, thereby causing the trigger C to advance. The arm $l$ lies on the right side of the trigger-blade $c$ and the arm $l'$ between the trigger-blades.

The left barrel can be fired first when there is time for the finger to push the trigger C forward prior to pulling the trigger D. Only a slight forward pressure on the trigger C is necessary, because the arm of the trigger-spring, that keeps said trigger up to the sear-tail F, does not offer much resistance. When firing the left barrel first, said arm of the trigger-spring keeps the back of the trigger C against the finger, and directly the finger is withdrawn from between the triggers the trigger C resumes its normal position, being therefore instantly available for firing the right barrel.

The mechanism described above is less complicated than single-trigger mechanism and does not require an extra limb to be operated before the order in which the barrels are fired can be reversed.

The slide N, Figs. 15 to 17, lies between the trigger-blades and has a spur $n$, that enters a slot $p$ in the trigger C'. The tail $n^\times$ of the slide is surrounded by a spiral spring inclosed in a barrel O, screwed to the trigger-plate B. The slide also has two projections $n'$ and $n''$. When after firing the right barrel the gun is opened, the safety-bolt R is actuated in the usual way and (bearing against the projection $n'$) takes back the slide N to its normal position. The right sear-tail $f^\times$ lies just above the path of the projection $n''$ when the right tumbler is down. (The right tumbler employed in this construction has the point that corresponds with the point $x'$, Fig. 5, farther from the axis $h$ than the arc $x$.) Directly the right tumbler is cocked the right sear-nose snaps into bent and the sear-tail $f^\times$ falls in front of the projection $n''$. When in order to free the triggers the safety-bolt R is moved forward by the thumb-piece, the projection $n''$ goes up to the sear-tail $f^\times$, which then holds back the slide N against the pressure of the spiral spring. (The working of this mechanism so far will be readily understood by those familiar with single-trigger mechanisms.) After the right lock has been released and the finger removed from the right trigger, inasmuch as the sear-tail $f^\times$ is held by the right tumbler clear of the projection $n''$ and the projection $n'$ is free to follow the safety-bolt R, the slide N advances and the spur $n$, pressing against the front end of the slot $p$, turns the trigger C' into its advanced position. The slot $p$ permits the trigger C' to be pressed forward for the purpose of enabling the left barrel to be fired first. As the slide N occupies the space between the trigger-blades commonly allotted to the split trigger-spring, two separate trigger-springs (not shown) placed outside the trigger-blades are used in this construction.

The mechanism illustrated in Figs. 15 to 18, though perfectly sound and strong, is comparatively complicated, but is given as a specimen of what comes within the scope of the present invention.

What I claim as my invention, and desire to secure by Letters Patent, is—

1. In double-barrel drop-down guns and rifles having two triggers, these being arranged near together, the combination, with the first trigger and the first lock, of means for causing said trigger (after the firing of the first barrel) to advance far enough to leave sufficient space for enabling the finger to be readily pressed against the second trigger, substantially as set forth.

2. In double-barrel drop-down guns and rifles having two triggers, these being arranged near together, the combination, with the first trigger, and the tumbler, the sear and the sear-spring of the first lock, of a lever upon which (after the firing of the first barrel) that sear acts so as to cause said trigger to advance and leave sufficient space for enabling the finger to be readily pressed against the second trigger, substantially as set forth.

JAMES W. SMALLMAN.

Witnesses:
R. SMALLMAN,
A. C. HUDSON.